(12) United States Patent
Ikeda

(10) Patent No.: US 9,398,277 B2
(45) Date of Patent: Jul. 19, 2016

(54) PROJECTION TYPE DISPLAY DEVICE AND METHOD FOR PRODUCING RECORDED IMAGES

(75) Inventor: Hiroaki Ikeda, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 141 days.

(21) Appl. No.: 14/383,831

(22) PCT Filed: Mar. 13, 2012

(86) PCT No.: PCT/JP2012/056360
§ 371 (c)(1),
(2), (4) Date: Sep. 8, 2014

(87) PCT Pub. No.: WO2013/136427
PCT Pub. Date: Sep. 19, 2013

(65) Prior Publication Data
US 2015/0109533 A1    Apr. 23, 2015

(51) Int. Cl.
*G03B 21/14* (2006.01)
*H04N 9/31* (2006.01)
(Continued)

(52) U.S. Cl.
CPC ........... *H04N 9/3182* (2013.01); *H04N 9/3185* (2013.01); *H04N 9/3194* (2013.01);
(Continued)

(58) Field of Classification Search
CPC .... G03B 21/147; G03B 21/14; H04N 9/3182; H04N 9/69; H04N 9/646; H04N 9/643; H04N 9/3194; H04N 9/3185; H04N 9/3179; H04N 9/31; G09G 2320/0242; G09G 5/026; G09G 2320/0666

USPC .............. 353/69; 349/59, 589, 593, 600, 601, 349/602
See application file for complete search history.

(56) References Cited

U.S. PATENT DOCUMENTS

| | | | | |
|---|---|---|---|---|
| 2003/0164927 A1* | 9/2003 | Tsukada | ............ | H04N 5/44513 353/31 |
| 2008/0036976 A1* | 2/2008 | Han | ...................... | H04N 9/3194 353/69 |
| 2013/0113975 A1* | 5/2013 | Gabris | ................... | G03B 17/54 348/333.1 |

FOREIGN PATENT DOCUMENTS

| | | |
|---|---|---|
| JP | 11-327789 A | 11/1999 |
| JP | 2003-143348 A | 5/2003 |

(Continued)

OTHER PUBLICATIONS

International Search Report (ISR) (PCT Form PCT/ISA/210), in PCT/JP2012/056360, dated Jun. 19, 2012.

*Primary Examiner* — William C Dowling
*Assistant Examiner* — Ryan Howard
(74) *Attorney, Agent, or Firm* — McGinn IP Law Group, PLLC

(57) ABSTRACT

A projection type display device includes projection means that projects an input image, representing an object on a background and that corresponds to an input video signal, onto a projection surface on which a user writes information, and processing means that, upon receiving a photographing instruction, stops projection by the projection means and photographs the projection surface to generate a photographed image, and detects the difference between the color of the background in the input image and the color of the projection surface in the photographed image, to generate a corrected image by correcting the color of the input image or the photographed image so as to reduce the difference, and generates a recorded image by superimposing the corrected image on the remaining input image or the photographed image.

9 Claims, 7 Drawing Sheets

(51) Int. Cl.
*H04N 9/64* (2006.01)
*H04N 9/69* (2006.01)
*G09G 3/00* (2006.01)
*G09G 5/02* (2006.01)

(52) U.S. Cl.
CPC .............. *H04N 9/643* (2013.01); *H04N 9/646* (2013.01); *H04N 9/69* (2013.01); *G03B 21/14* (2013.01); *G09G 3/001* (2013.01); *G09G 5/026* (2013.01); *G09G 2320/0242* (2013.01); *G09G 2320/0693* (2013.01)

(56) References Cited

FOREIGN PATENT DOCUMENTS

| | | |
|---|---|---|
| JP | 2006-53313 A | 2/2006 |
| JP | 2008-33189 A | 2/2008 |
| JP | 2010-122275 A | 6/2010 |
| JP | 2011-33936 A | 2/2011 |
| JP | 2011-64777 A | 3/2011 |
| JP | 2011-141600 A | 7/2011 |
| JP | 2012-60452 A | 3/2012 |

* cited by examiner (a) HUE CIRCLE  (b) BRIGHTNESS AND SATURATION

| HUE (DEGREE) | GRADATION R | G | B |
|---|---|---|---|
| 0 | 255 | 0 | 0 |
| ⋮ | | | |
| 60 | 255 | 255 | 0 |
| ⋮ | | | |
| 120 | 0 | 255 | 0 |
| ⋮ | | | |
| 180 | 0 | 255 | 255 |
| ⋮ | | | |
| 240 | 0 | 0 | 255 |
| ⋮ | | | |
| 300 | 255 | 0 | 255 |
| ⋮ | | | |

REGION OF RESOLUTION OF DISPLAY SECTION 14

PROJECTION TYPE DISPLAY DEVICE AND METHOD FOR PRODUCING RECORDED IMAGES

TECHNICAL FIELD

The present invention relates to a projection type display device and a method for producing recorded images, in each of which device and method an input image based on an input video signal inputted into the projection type display device is projected onto a projection surface, such as a white board, and then when additional information, such as a character, is written on the projection surface, a recorded image representing the input image and the additional information is generated.

BACKGROUND ART

In a school class or a corporate meeting in which a projector that is a projection type display device is used, there is a case where a writing surface, such as a white board, on which a user can perform writing, is used as a projection surface, and where additional information, such as a character, is written on the projection surface in a state where an input image is projected onto the projection surface. In this case, the input image and the additional information are on the projection surface (writing surface). It should be noted that the input image means an image which includes an object, such as a symbol or a character, represented on a background of the image and which is used for presentations, or the like.

Patent Literature 1 describes an image projection device that records a projection surface on which an inputted image and additional information exist.

In the image projection device described in Patent Literature 1, a recorded image is generated in such a manner that the input image projected on the projection surface is photographed together with the additional information written on the projection surface.

CITATION LIST

Patent Literature

Patent Literature 1: JP2006-53313A

SUMMARY OF INVENTION

Technical Problem

In the image projection device described in Patent Literature 1, the input image projected on the projection surface is photographed together with the additional information written on the projection surface, and hence there is a problem in which, when it is difficult to distinguish the input image on the projection surface, it is also difficult to distinguish the input image in the recorded image. This is due to the fact that the luminance of additional information, such as a character, is significantly different from the luminance of the input image on the projection surface.

As a method for solving this problem, a method can be considered in which a photographed image is generated in such a manner that, after additional information is written on the projection surface, the projection surface is photographed by stopping projection of the input image, and in which a recorded image is generated by superimposing the photographed image on the input image received by the projector (an input image specified by an input video signal).

However, when this method is used, there arises a problem in which, when the color of an object in the input image is the same as the color of the photographed image located at the position of the object, it is difficult to distinguish the object on the recorded image that was generated by superimposing the photographed image on the input image.

An object of the present invention is to providing a projection type display device and a method for producing recorded images, the device and the method being capable of solving the above-described problem.

Solution to Problem

A projection type display device according to the present invention includes:

projection means that projects an input image, representing an object on a background and corresponding to an input video signal, onto a projection surface on which a user writes information, and processing means that, upon receiving a photographing instruction to perform photographing, stops projection by the projection means and photographs the projection surface to generate a photographed image, and detects a difference between the color of the background in the input image and the color of the projection surface in the photographed image, to generate a corrected image by correcting the color of the input image or the photographed image so as to reduce the difference, and generates a recorded image by superimposing the corrected image on the other of the input image and the photographed image.

A method for producing recorded images according to the present invention is a method for producing recorded images in the projection type display device, the method including the steps of:

projecting an input image, representing an object on a background and that corresponds to an input video signal, onto a projection surface on which a user writes information, and upon receiving a photographing instruction to perform photographing, stopping the projection and photographing the projection surface to generate a photographed image, and detecting a difference between the color of the background in the input image and the color of the projection surface in the photographed image, to generate a corrected image by correcting the color of the input image or the photographed image so as to reduce the difference, and generating a recorded image by superimposing the corrected image on the other of the input image and the photographed image.

Advantageous Effects of Invention

With the present invention, it is possible to prevent that display information such as a character in the input image becomes difficult to be discriminated in a recorded image generated by superimposing a photographed image on an input image.

DESCRIPTION OF EMBODIMENTS

In the following, exemplary embodiments according to the present invention will be described with reference to the accompanying drawings.
(First Embodiment)

Figure 1:
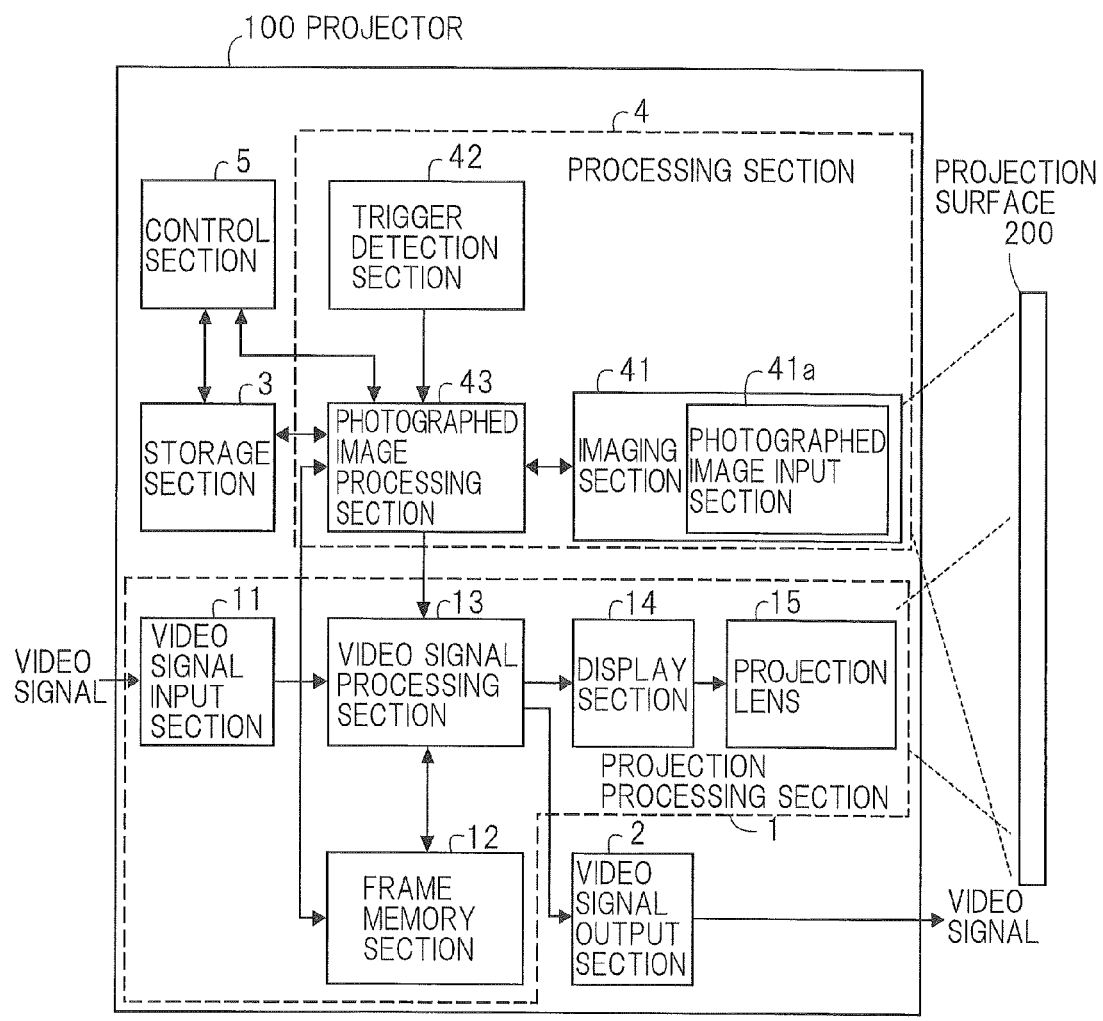
FIG. 1 is a view showing projector 100 of a first exemplary embodiment of the present invention.

FIG. 1 is a view showing projector 100 of a first exemplary embodiment of the present invention.

Projector 100 is an example of a projection type display device and includes projection processing section 1, video signal output section 2, storage section 3, processing section 4, and control section 5. Projection processing section 1 includes video signal input section 11, frame memory section 12, video signal processing section 13, display section 14, and projection lens 15. Processing section 4 includes imaging section 41, trigger detection section 42, and photographed image processing section 43. Imaging section 41 includes photographed image input section 41a having an imaging lens.

Projection processing section 1 is an example of projection means.

Projection processing section 1 projects an input image corresponding to an input video signal, onto projection surface 200 on which a user writes information. It should be noted that an input image in the present invention represents an image which is used for presentations, and the like, and in which an object, such as a character, a symbol, a picture, and a photograph, is represented on the background.

In the present exemplary embodiment, a writing surface (for example, a white board, a blackboard, or the like), on which the user can write information, is used as projection surface 200.

For this reason, the user can write, as additional information, information including a memo, and the like, on projection surface 200 on which an input image is displayed.

Video signal input section 11 receives a video signal (input video signal) representing an input image from an electronic device such as, a PC (personal computer). Upon receiving the video signal, video signal input section 11 outputs the received video signal to video signal processing section 13.

Video signal processing section 13 can output the video signal from video signal input section 11 as is or after signal processing to video signal output section 2. Further, video signal processing section 13 outputs the input video signal to frame memory section 12. Further, video signal processing section 13 reads a video signal from frame memory section 12, to generate a projection image to be displayed onto a projection region by applying signal processing (for example, image quality adjustment, resolution conversion, trapezoidal distortion correction, or the like) to the read video signal as required, and then outputs the video signal subjected to the signal processing to display section 14.

Upon receiving the video signal from video signal processing section 13, frame memory section 12 stores therein an image corresponding to the video signal per frame.

Display section 14 receives the video signal subjected to the signal processing, and displays a projection image corresponding to the video signal subjected to the signal processing, and generates projection light representing the projection image by modulating, according to the projection image, light from a lamp (not shown) that is a light source.

Projection lens 15 projects the projection light (projection image) generated by display section 14 onto projection surface 200.

Video signal output section 2 receives, for example, the video signal received by video signal input section 11 via video signal processing section 13, and outputs the received video signal to an external device (for example, an external display device).

Storage section 3 stores therein various images.

Processing section 4 is an example of processing means.

Upon receiving a photographing instruction to perform photographing, processing section 4 stops projection by projection processing section 1, and photographs projection surface 200, so as to generate a photographed image.

Imaging section 41 photographs projection surface 200.

In the present exemplary embodiment, it is assumed that a display image (input image) corresponding to an input video signal is projected on a part of the region (hereinafter referred to as "display region") of projection surface 200. Further, it is assumed that the whole region of projection surface 200 is a writable region (hereinafter referred to as "writing region"), and that imaging section 41 photographs the whole region of projection surface 200.

When projection of the display image corresponding to the input video signal onto projection surface 200 is stopped, imaging section 41, for example, photographs projection surface 200 on which additional information such as a memo, is written.

Trigger detection section 42 receives a photographing instruction to perform photographing.

When trigger detection section 42 receives the photographing instruction, photographed image processing section 43 stores an input image (for example, an image corresponding to an input video signal) in storage section 3, and then stops projection by projection processing section 1, so as to generate a photographed image by photographing projection surface 200 by using photographing section 41.

Control section 5 performs control of projector 100, for example, control for projection display of an image, and the like. It should be noted that photographed image processing section 43 may be incorporated in control section 5.

Photographed image processing section 43 detects a difference (hereinafter referred to as "color difference") between the background color in an input image, and the color of projection surface 200 in a photographed image.

Photographed image processing section 43 generates a corrected image by correcting the color of the input image or the photographed image (for example, photographed image) so as to reduce the difference in a color of a predetermined region.

Photographed image processing section 43 generates a recorded image by superimposing the corrected image on the remaining input image or the photographed image (the input image when the one image is the photographed image).

Here, projection of the input image by projection processing section 1 is described.

Generally, when the angle of the projection optical axis of the projection lens of the projector is not perpendicular to the projection surface, an image projected from the projector and displayed on the projection surface is distorted into a trapezoidal shape.

For this reason, in projector 100, video signal processing section 13 performs trapezoidal distortion correction to the display image corresponding to the input video signal displayed by display section 14 so that the display image corresponding to the input video signal distorted into a trapezoidal shape on projection surface 200 is made into a rectangular shape.

Figure 2:
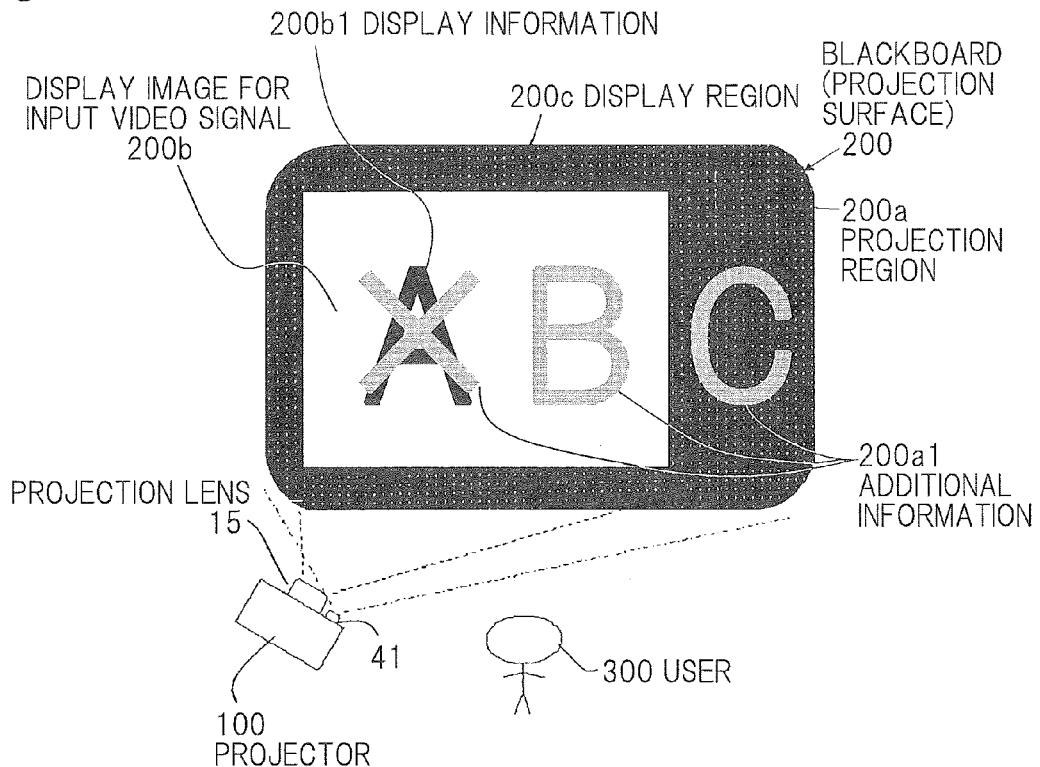
FIG. 2 is a view showing an example of a projection image on projection surface 200.

FIG. 2 is a view showing a state which is seen from the front surface of blackboard 200 used as projection surface 200, and in which a projection image projected from projector 100 and distorted into a trapezoidal shape is displayed in a predetermined region (hereinafter referred to as "projection region") of a part of the blackboard, and also a memo is written on blackboard 200 by user 300.

In FIG. 2, projector 100 is simply illustrated on the assumption that it is located on the obliquely lower left side of blackboard 200 and projects the projection image onto blackboard 200.

That is, in a case where the projection optical axis of projection lens 15 of projector 100 is not parallel with the normal of projection surface 200, there are simply shown, in FIG. 2, projection region 200a in which a projection image distorted into a trapezoidal shape is displayed, and display region 200c in which display image 200b corresponding to an input video signal formed into a rectangular shape on projection surface 200 by trapezoidal distortion correction is displayed.

It should be noted that character "A" shown in display region 200c is display information (object) 200b1 in display image 200b corresponding to the input video signal, and symbol "X", characters "B" and "C" which are shown on blackboard 200 are additional information (written memo) 200a1 written by user 300.

Further, similarly to the projection image which is distorted due to the relationship between projection surface 200 and the projection optical axis of projection lens 15 of projector 100, the photographed image of projection surface 200 is distorted into a trapezoidal shape due to the relationship between projection surface 200 and the optical axis of the imaging lens of photographed image input section 41.

Figure 3:
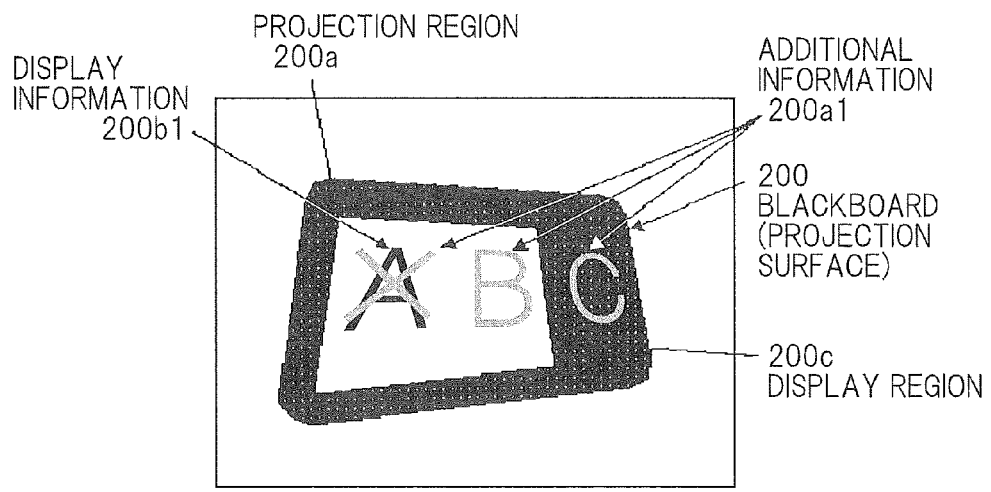
FIG. 3 is a view showing an image generated by photographing blackboard 200 shown in FIG. 2.

FIG. 3 is a view showing an image generated by imaging section 41 when imaging section 41 photographs blackboard (projection surface) 200 shown in FIG. 2.

It should be noted that, when the projection optical axis of projection lens 15 and the optical axis of the imaging lens are arranged parallel with each other, and when the distance between the center of projection lens 15 and the center of the imaging lens is sufficiently smaller than the distance between projection surface 200 and the projection lens of projector 100, projection region 200a becomes an approximately rectangular shape in the image generated by imaging section 41.

Next, a color space consisting of tint (Hue), saturation (Saturation, Chroma), and brightness (Brightness, Value) will be described.

Figures 4, 5:
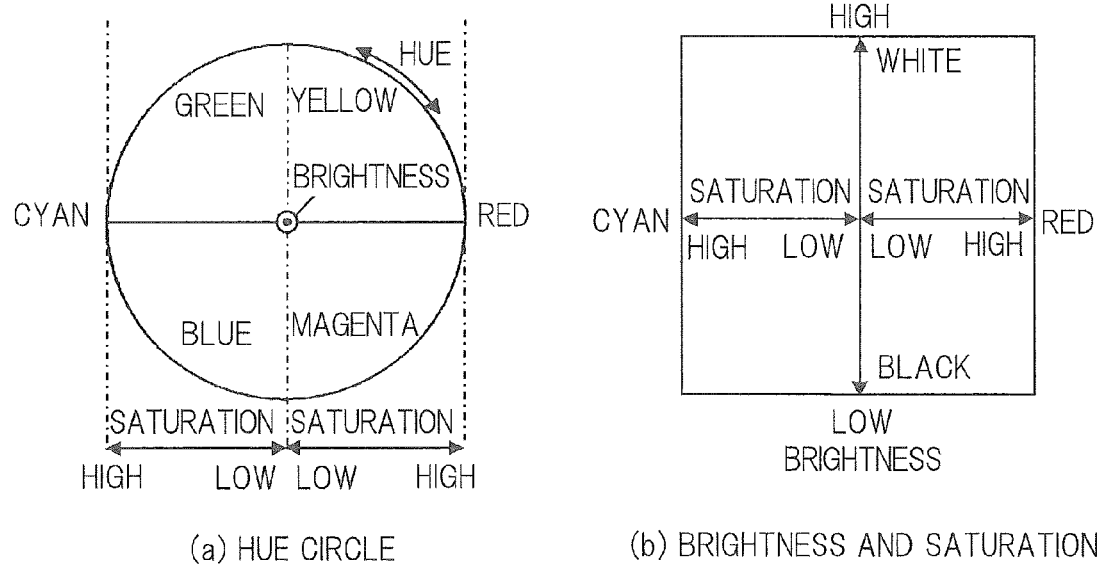
FIG. 4 shows a general HSB color space.
FIG. 5 is a view showing a relationship between the hue and the R, G, B gradation values.

A color space consisting of hue, saturation, and brightness, is referred to as, for example, HSB (Hue, Saturation, Brightness) color space or HSV (Hue, Saturation, Value) color space, as shown in FIG. 4.

FIG. 4 shows a general HSB color space.

FIG. 4(a) shows a hue circle in which respective colors are arranged in a circumferential direction so as to represent hues. It should be noted that, in the hue circle shown in FIG. 4(a), the saturation is lower at a position closer to the center of the circle and is higher at a position closer to the circumference.

FIG. 4(b) is a view which mainly shows the relationship between the brightness and the saturation, and in which the brightness is represented by vertical components on the plane showing the hue circle shown in FIG. 4(a). It should be noted that, when the brightness of a color is high, the color is whitish (bright), and when the brightness of a color is low, the color is blackish (dark).

It should be noted that FIG. 4 shows a columnar color space by using FIG. 4(a) and FIG. 4(b), but there is a case where the relationship between the brightness and the saturation shown in FIG. 4(b) is expressed with, for example, a round shape, a triangular shape, or the like, and thereby the color space is represented by a spherical shape, a conical shape, or the like.

In FIG. 4(a), for example, when the blue hue region is shifted by 180 degrees, the region is shifted to the yellow hue region. That is, in the hue circle, hues, which are located at positions opposite to each other (positions apart from each other by 180 degrees) via the center of the hue circle, are complementary to each other.

Further, in FIG. 4(a), when the saturation is 0, a color on the circumference has no saturation, and the color is changed between black (dark) and white (bright) on the basis of the brightness.

It should be noted that, in the present exemplary embodiment, it is described that the hue change range is set in a range of 0 to 360 degrees, and that the saturation change range and the brightness change range are each normalized to a range from a minimum value of 0 to a maximum value of 1.

Further, it is described that the change range of gradation of each of the color components of R (red), G (green), and B (blue) is set in a range from a minimum value of 0 to a maximum value of 255.

At this time, the relationship between a hue value and R, G, B gradation values is shown, for example, by FIG. 5. However, the relationship between the hue value and the R, G, B gradation values, which relationship is shown by FIG. 5, is suitably set according to the relationship between wavelength characteristics of each of the colors of a light source that is used when projector 100 projects an image.

Generally, in the case where the relationship between the hue value and the R, G, B gradation values is set as shown in FIG. 5, white color corresponding to the brightness maximum value of 1 is obtained at the time when R=G=B=255, and black color corresponding to the brightness minimum value of 0 is obtained at the time when R=G=B=0.

Further, red color corresponding to the saturation maximum value of 1 is obtained at the time when R=255 and when G=B=0. When, as the saturation value is lowered, the value of R color is reduced to become the minimum value of 0, that is, when R=G=B=0, black color is obtained.

It should be noted that a mutual conversion method is widely known in which R, G, B values corresponding to R, G, B signals and to luminance color difference signals (for example, Y, Cb, Cr signals), and values representing luminance and color difference are converted to and from values representing hue, saturation, and brightness.

Next, operation will be described.

First, in projector 100, projection processing section 1 projects and displays display image corresponding to an inputted video signal on display region 200c of projection surface 200. User 300 writes additional information 200a1, such as a memo, on projection surface 200 while performing a presentation or giving a lesson by using the display image on projection surface 200. In the following, projection surface 200, on which the display image corresponding to the input video signal is projected, and on which the additional information is written, is assumed to be in the state shown in FIG. 2.

Then, for example, when, in order to perform photographing, user 300 operates an operation button (not shown) (main body button) that is arranged at a remote controller or projector 100, the remote controller or the main body button outputs a photographing instruction. When detecting the photographing instruction, trigger detection section 42 outputs the photographing instruction to photographed image processing section 43.

Upon receiving the photographing, instruction, photographed image processing section 43 stores, in storage section 3, an input image corresponding to a display image projected from projector 100 at the time of reception of the photographing instruction. It should be noted that the input image, and the image photographed by imaging section 41 are assumed to be represented in a color space represented by RGB values.

Figure 6:
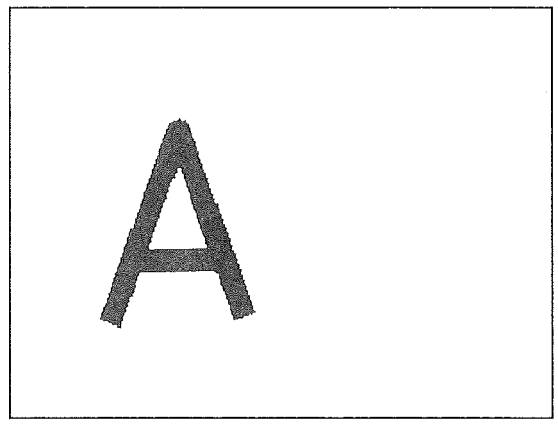
FIG. 6 is a view showing an example of an input image stored in storage section 3.

FIG. 6 is a view showing an example of the input image stored in storage section 3.

It should be noted that photographed image processing section 43 may store a video signal inputted from video signal input section 11 as an input image as is in storage section 3, or may store an input image stored in frame memory section 12 in storage section 3. It should be noted that, when the input image stored in frame memory section 12 is stored in storage section 3, it is preferred that frame memory section 12 temporarily stops storing the video signal received from video signal processing section 13 when completing the storing of the video signal per frame, and then starts storing, in storage section 3, the input image stored in frame memory section 12, and further, after completing the storing of the input image, resumes the storing of the video signal.

Next, photographed image processing section 43 controls video signal processing section 13, so as to switch the image projected from projector 100 to a test image. The test image is, for example, an image in which, in the projected image projected on projection region 200a, the peripheral portion (hereinafter referred to as "frame") of the display image corresponding to the input video signal is represented by white, and the other region of the display image is represented by black. It should be noted that the test image is stored beforehand, for example, in storage section 3, and photographed image processing section 43 outputs the test image stored in storage section 3 to video signal processing section 13, so that video signal processing section 13 displays the test image on display section 14. It should be noted that the displayed test image may be any kind of image as long as the test image can be extracted from the display region corresponding to the input video signal.

Next, photographed image processing section 43 photographs a region including display region 200c of projection surface 200 by using imaging section 41 and generates an image (hereinafter referred to as "extraction image") representing a region in which the test image is displayed. It should be noted that, in the present exemplary embodiment, whole projection surface 200, in which the test image is displayed, is photographed by imaging section 41.

Figure 7:
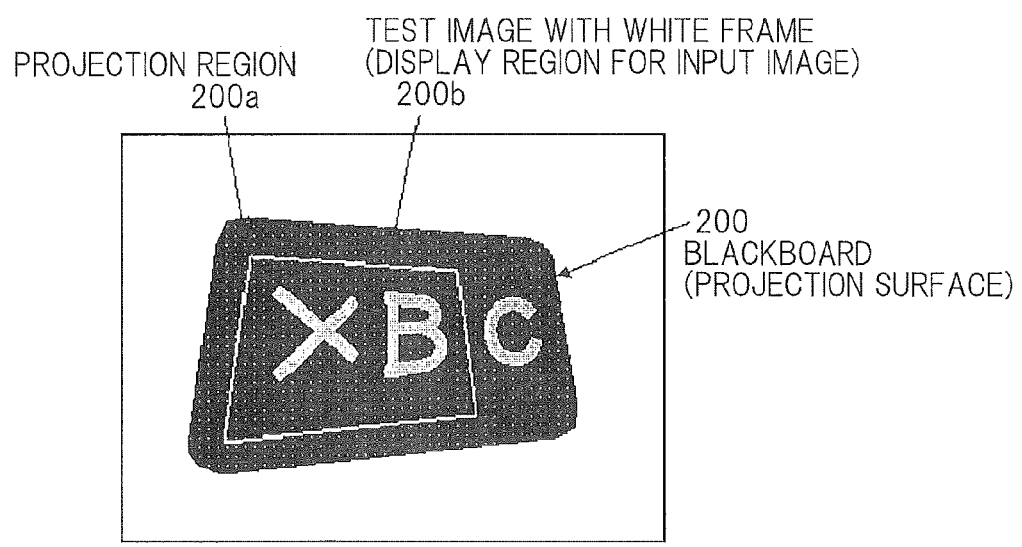
FIG. 7 is a view showing an example of an extraction image representing a region in which a test image is displayed.

FIG. 7 is a view showing an example of the extraction image representing the region (whole projection surface 200) in which the test image is displayed.

Next, photographed image processing section 43 extracts writing region (projection surface) 200, and display region 200c in which the display image corresponding to the input video signal is displayed from the extraction image.

For example, photographed image processing section 43 extracts the region inside the frame shown in the test image as display region 200c from the extraction image. Further, photographed image processing section 43 extracts an approximately quadrangular region which is a peripheral portion of display region 200c and which includes a region where a change in luminance, color, and the like, is small as writing region 200 from the extraction image.

Next, photographed image processing section 43 controls video signal processing section 13 so that the projection image of projector 100 is not temporarily displayed. Then, photographed image processing section 43 photographs a region (whole projection surface 200 in the present exemplary embodiment) including display region 200c in projection surface 200 by using imaging section 41.

Figure 8:
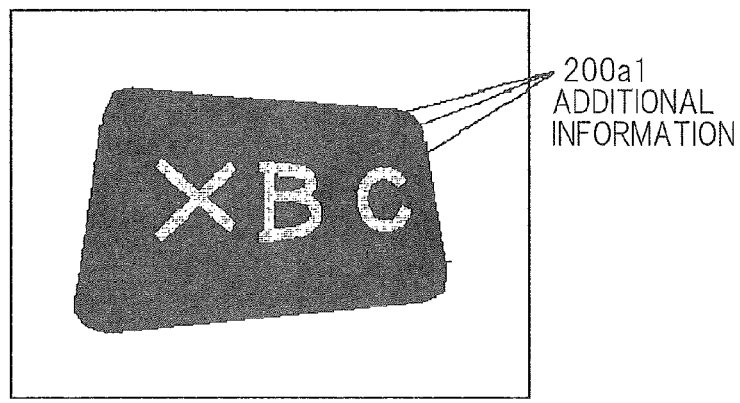
FIG. 8 is a view showing an example of a photographed result in a state where the projection image is not displayed.

FIG. 8 is a view showing an example of a photographing result of imaging section 41 in the state where the projection image of projector 100 is not displayed.

It should be noted that, as the method for making a projection image of projector 100 temporarily not displayed, it is possible to use a method, such as a method in which a whole black image (a black image for whole projection region 200a) is displayed as a display image of display section 14, a method in which a lamp serving as the light source is switched off, or a method in which, when projector 100 is provided with a light shielding plate in the middle of the optical path from the light source to projection surface 200, the light shielding plate is closed.

Next, on the basis of the result of photographing (see FIG. 8) by imaging section 41, and on the basis of display region 200c and writing region (projection surface) 200 which are previously extracted, photographed image processing section 43 generates a writing image representing the region in which the additional information is written. It should be noted that the writing image is an example of a photographed image.

Figure 9:
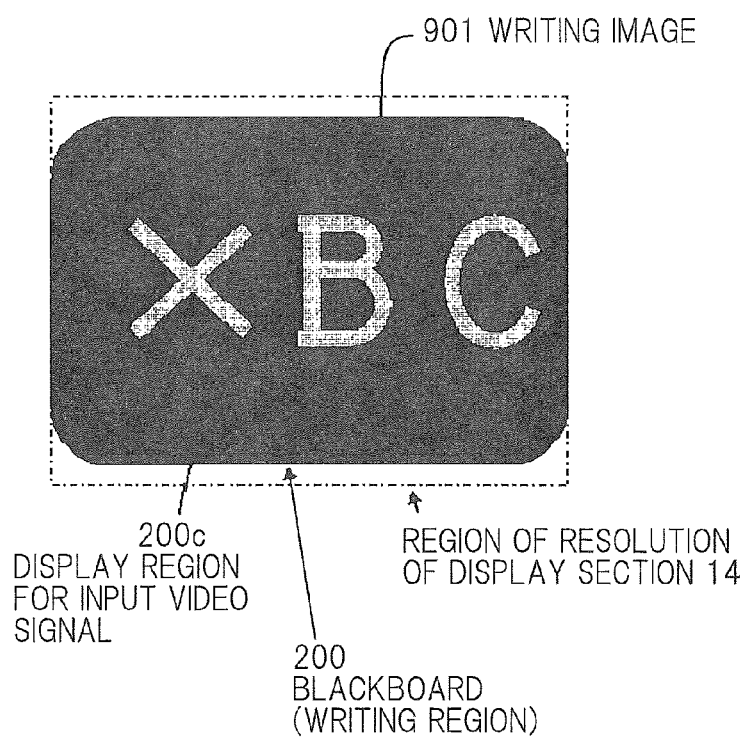
FIG. 9 is a view showing an example of writing image 901.

FIG. 9 is a view showing an example of writing image 901.

In the present exemplary embodiment, photographed image processing section 43 generates writing image 901 by performing, in the longitudinal direction or lateral direction, resolution conversion and trapezoidal distortion correction of writing region (projection surface) 200 in the result of photographing by imaging section 41 so that the resolution of writing image 901 in the longitudinal direction or lateral direction is the same as the resolution of display section 14, and so that the aspect ratio of display region 200c in writing region (projection surface) 200 represented in writing image 901 is substantially the same as the aspect ratio of the input image.

That is, when the resolution of display section 14 is 1024× 768, photographed image processing section 43 performs resolution conversion and trapezoidal distortion correction so that the lateral resolution of writing region 200 in writing image 901 becomes 1024 or less, and also the longitudinal resolution of writing region 200 becomes a maximum resolution among resolution candidates of 768 or less, and so that display region 200c in writing region 200 has an approximately rectangular shape, and also the aspect ratio of display region 200c is substantially the same as the aspect ratio of the input image.

For example, when writing region 200 is long in the lateral direction, photographed image processing section 43 sets the lateral resolution of writing region 200 to the maximum value of 1024 and sets the longitudinal resolution of writing region 200 to 768 or less.

It should be noted that resolution conversion techniques relating to reduction and expansion of a screen are already disclosed to the public. Further, a technique for correcting a trapezoidal distortion, which is generated at the time when an image is projected onto a projection surface in an oblique direction by a projection type display device, is disclosed as art relating to trapezoidal distortion correction. On the basis of this technique, photographed image processing section 43 can cope with the projection distortion by performing the reverse correction of trapezoidal distortion correction to an image.

Further, photographed image processing section 43 converts the resolution of the input image in storage section 3 to generate a synthetic input image so that the shape of the input image in storage section 3 is made to be the same as the shape of display region 200c in writing image 901.

Figure 10:
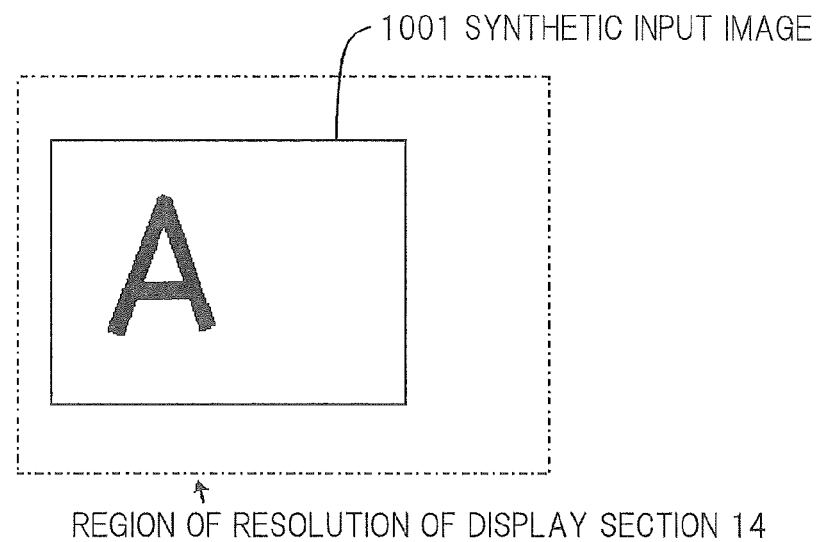
FIG. 10 is a view showing an example of synthetic input image 1001.

FIG. 10 is a view showing an example of synthetic input image 1001.

Next, photographed image processing section 43 converts the color space of synthetic input image 1001 and writing image 901, from the color space being represented by RGB values, into, for example, a color space represented by HSV (hue, saturation and brightness) values.

It should be noted that, in the present exemplary embodiment, photographed image processing section 43 generates a recorded image by correcting the hue, brightness and saturation of writing image 901 and by not correcting the hue, brightness and saturation of synthetic input image 1001. That is, photographed image processing section 43 corrects writing image 901 by calculating correction amounts from the relationship between the background (projection surface) of writing image 901 and the background of synthetic input image 1001. For this reason, photographed image processing section 43 may be configured to extract the region of the background of synthetic input image 1001 in advance, and to convert the extracted background into an HSV color space, so as to calculate the correction amounts of writing image 901 from the relationship between the conversion result and the background color of writing image 901. Therefore, it is not necessary for photographed image processing section 43 to convert the whole of synthetic input image 1001 into the HSV color space.

Next, photographed image processing section 43 detects the color of the background of synthetic input image 1001' converted into the HSV color space.

For example, in synthetic input image 1001' converted into the HSV color space, photographed image processing section 43 generates the distribution (the number of pixels) of respective colors of pixels included in the region (frame region) between the outer periphery of synthetic input image 1001' and the boundary configured by respective pixels that are on the inner side from the outer periphery by a predetermined number of pixels, and sets the color of the largest number of pixels as the color of the background of synthetic input image 1001' and uses, as the background, the pixels displaying the color of the background.

It should be noted that photographed image processing section 43 may set a color in a predetermined range including the color of the largest number of pixels as the background color of synthetic input image 1001'.

The reason why the color of the background is specified by using the vicinity of the outer periphery of an image is that the vicinity of the outer periphery of the image is used as the background in many cases. It should be noted that, when the position of the background can be specified beforehand in synthetic input image 100P, photographed image processing section 43 may detect the color of the background of synthetic input image 1001' on the basis of the specified position.

Next, photographed image processing section 43 detects the color of the background of writing region 200' in writing image 901' converted into the HSV color space, that is, detects the color of projection surface 200' in writing image 901'.

For example, photographed image processing section 43 generates the distribution (the number of pixels) of colors of respective pixels included in the region (frame region) between the outer periphery of writing region 200' and the boundary formed by respective pixels existing on the inner side from the outer periphery of writing region 200' by a predetermined number of pixels in writing region 200'. Photographed image processing section 43 sets the color of the largest number of pixels as the color of the background of writing region 200', and uses the pixels that represent the color of the background as the background.

Further, photographed image processing section 43 may set a color of a predetermined range including the color of the largest number of pixels as the color of the background of writing region 200'.

It should be noted that, when an image is photographed, the photographed image is subjected to the influence of interior illumination, and the like, and in some cases, the brightness and saturation of the photographed image may be changed depending on the places of the projection surface. For this reason, photographed image processing section 43 may be configured to determine the hue of the background by focusing only on the hues of the photographed image, and may be configured to set the color (hue, saturation and brightness) to which the largest number of pixels among the pixels of the determined hue belong as the color of the background.

The reason why the color of the background is specified by using the vicinity of the outer periphery of writing region 200' is that the vicinity of the outer periphery of writing region 200' is set as the background in many cases. It should be noted that, when the position of the background can be specified beforehand in writing region 200', photographed image processing section 43 may detect the color of the background of writing region 200' on the basis of the specified position.

Next, photographed image processing section 43 determines the relationship between the color of the background of synthetic input image 1001' and the color of the background of writing region 200'.

First, photographed image processing section 43 calculates the difference Dh between the hue value of the background of synthetic input image 1001' and the hue value of the background (projection surface 200') of writing region 200'. For example, photographed image processing section 43 calculates a value by subtracting the hue value of the background of writing image 901' from the hue value of the background of synthetic input image 1001', and sets the calculated value (of the difference which takes a positive or negative value) as the difference Dh of the hue values.

Next, on the basis of the value of 0.5 which is the middle brightness value, photographed image processing section 43 specifies a first region (black region) that has a brightness value of 0 or more to 0.5 or less, and a second region (white region) that has a brightness value of 0.5 or more to 1.0 or less. Then, photographed image processing section 43 determines in which of the first and second regions the brightness value of the background of synthetic input image 1001', and the brightness value of the background of writing region 200' are each included. On the basis of the determination result, photographed image processing section 43 sets brightness inversion flag Fv to OFF at the time when the brightness value of the background of synthetic input image 1001' and the brightness value of the background of writing region 200' are included in the same region, and sets brightness inversion flag Fv to ON at the time when the brightness value of the background of synthetic input image 1001' and the brightness value of the background of writing region 200' are respectively included in the different regions. When brightness inversion flag Fv is ON, photographed image processing section 43 performs inversion processing in which the brightness value of the background of writing region 200' is inverted on the basis of the middle value of 0.5. For example, when the value of brightness is 0.1, photographed image processing section 43 sets the brightness value to 0.9. It should be noted that it is preferred that, when the brightness value of at least one of the background images is 0.5, photographed image processing section 43 determines that both the background images are included in the same region. This is to avoid unnecessary inversion processing.

Next, photographed image processing section 43 calculates brightness coefficient Kv used for making the value of brightness of the background of writing region 200' equal to the value of brightness of the background of synthetic input image 1001'. When Fv is ON, photographed image processing section 43 calculates brightness coefficient Kv on the basis of an expression: Kv=(the value of brightness of the background of synthetic input image 1001')/(the inverted value by brightness of the background of writing region 200'). When Fv is OFF, photographed image processing section 43 calculates brightness coefficient Kv on the basis of an expression: Kv=(the brightness value of the background of synthetic input image 1001')/(the brightness value of the background of writing region 200').

Next, on the basis of the middle saturation value of 0.5, photographed image processing section 43 specifies a third region (dull region) that has a saturation value of 0 or more to 0.5 or less, and a fourth region (bright region) that has a saturation value of 0.5 or more to 1.0 or less. Then, photographed image processing section 43 determines in which of the third and fourth regions the saturation of the background of synthetic input image 1001' and the saturation of the background of writing region 200' are each included. On the basis of the determination result, photographed image processing section 43 sets saturation inversion flag Fs to OFF at the time when the saturation value of the background of synthetic input image 1001' and the saturation value of the background of writing region 200' are included in the same region, and sets saturation inversion flag Fs to ON at the time when the saturation value of the background of synthetic input image 1001' and the saturation value of the background of writing region 200' are respectively included in the different regions. When saturation inversion flag Fs is ON, photographed image processing section 43 performs inversion processing in which the saturation value of the background of writing region 200' is inverted on the basis of the middle saturation value of 0.5. For example, when the saturation value is 0.2, photographed image processing section 43 sets the saturation value to 0.8. It should be noted that it is preferred that, when the saturation value of at least one of the background images is 0.5, photographed image processing section 43 determines that both the background images are included in the same region. This is to avoid unnecessary inversion processing.

Next, photographed image processing section 43 calculates saturation coefficient Ks used for making the saturation value of the background of writing region 200' equal to the saturation value of the background of synthetic input image 1001'. When Fs is ON, photographed image processing section 43 calculates saturation coefficient Ks on the basis of an expression: Ks=(the saturation value of the background of synthetic input image 1001')/(the inverted saturation value of the background of writing region 200'). When Fs is OFF, photographed image processing section 43 calculates saturation coefficient Ks on the basis of an expression: Ks=(the saturation value of the background of synthetic input image 1001')/(the saturation value of the background of writing region 200').

Then, photographed image processing section 43 corrects writing image 901' based on the determined relationship between the color of the background of synthetic input image 1001' and the color of the background of writing region 200'.

First, on the basis of calculated hue difference Dh, photographed image processing section 43 performs hue processing so that the hue of each of the pixels of writing image 901' is moved by calculated hue difference Dh (angle). That is, by this hue correction, the hues of all of the pixels of writing image 901' are changed while the hue differences (angular differences) between the pixels in writing image 901' are maintained.

Next, photographed image processing section 43 performs saturation inversion flag processing to saturation values of all the pixels of writing image 901' based on determined saturation inversion flag Fs. That is, when saturation inversion flag Fs is ON, photographed image processing section 43 performs inversion processing on the basis of saturation middle value of 0.5. When saturation inversion flag Fs is OFF, photographed image processing section 43 does not perform inversion processing so that the saturation values of all the pixels of writing image 901' are left unchanged. Next, photographed image processing section 43 performs saturation coefficient processing in which saturation coefficient Ks is multiplied to saturation values of all the pixels of writing image 901' in which saturation inversion flag processing has been performed based on calculated saturation coefficient Ks.

It should be noted that, when saturation inversion flag processing is performed, the difference between the color of the background of the writing image and the color of the background of the input image is reduced, and hence saturation coefficient processing may not be performed.

Next, photographed image processing section 43 performs brightness inversion flag processing to brightness values of all the pixels of writing image 901' based on determined brightness inversion flag Fv. That is, when brightness inversion flag Fv is ON, photographed image processing section 43 performs inversion processing on the basis of brightness middle value of 0.5. When brightness inversion flag Fv is OFF, photographed image processing section 43 does not perform inversion processing so that the brightness values of all the pixels of writing image 901' are left unchanged. Next, photographed image processing section 43 performs brightness coefficient processing in which brightness coefficient Kv is multiplied to brightness values of all the pixels of writing image 901' in which brightness inversion flag processing has been performed based on calculated brightness coefficient Kv.

It should be noted that, when brightness inversion flag processing is performed, the difference between the color of the background of the writing image and the color of the background of the input image is reduced, and hence brightness coefficient processing may not be performed.

Next, photographed image processing section 43 generates writing image 901 whose hue, saturation and brightness are corrected by converting writing image 901' with the color space represented by HSV values into the color space represented by RGB values.

Figure 11:
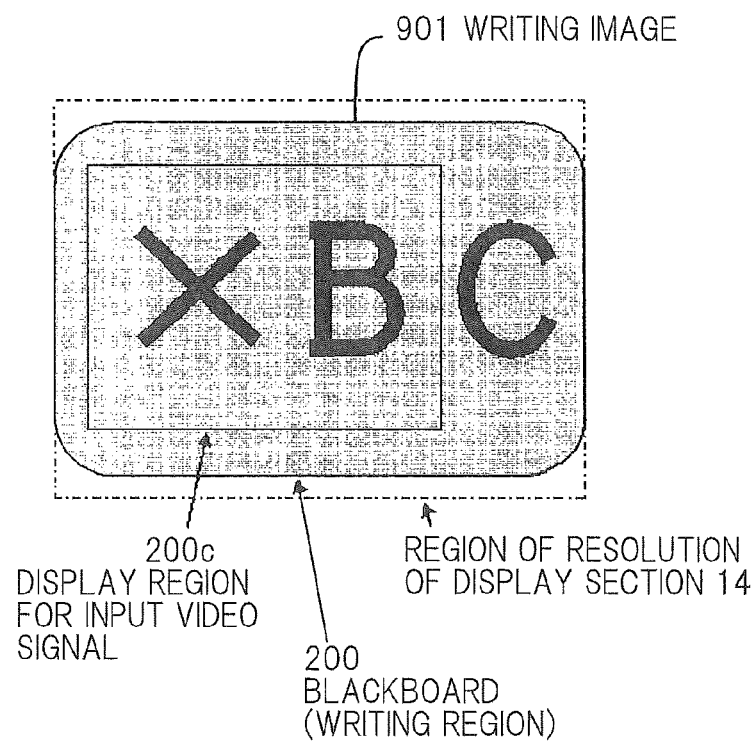
FIG. 11 is a view showing an example of writing image 901 corrected hue, brightness and saturation.

FIG. 11 is a view showing an example of writing image 901 subjected to hue, brightness and saturation corrections.

Then, photographed image processing section 43 generates a recorded image by superimposing (composing) writing image 901 (see FIG. 11) corrected hue, brightness and saturation, on synthetic input image 1001 (see FIG. 10). Photographed image processing section 43 stores the recorded image in storage section 3.

It should be noted that, in the present exemplary embodiment, when the brightness value of the background of synthetic input image 1001 is higher than a predetermined brightness threshold value (for example, white), photographed image processing section 43 performs synthesis (superimposition) of pixels so that pixels of darker colors are left among pixels in corrected writing image 901 and pixels in synthetic input image 1001 which are to be superimposed on the pixels in corrected writing image 901. When the brightness value of the background of synthetic input image 1001 is equal to or lower than the predetermined brightness threshold value (for example, black), photographed image processing section 43 performs synthesis (superimposition) of pixels so that pixels of bright colors are left among pixels in corrected writing image 901 and pixels in synthetic input image 1001 which are to be superimposed on the pixels in corrected writing image 901.

Figure 12:
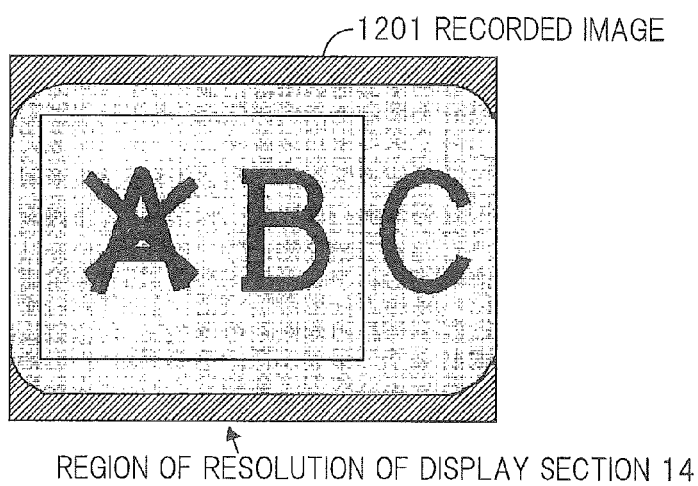
FIG. 12 is a view showing an example of recorded image 1201.

FIG. 12 is a view showing an example of recorded image 1201 in which writing image 901 shown in FIG. 11 is superimposed on synthetic input image 1001 shown in FIG. 10.

It should be noted that, when the resolution of writing region (projection surface) 200 is different from the aspect ratio of 1024×768 in recorded image 1201, for example, when writing region (projection surface) 200 is laterally long, the lateral resolution is set to 1024, and hence the longitudinal resolution is set to 768 or less. In this case, correction, in which an image such as, for example, a black image, is added in the insufficient longitudinal portion in recorded image 1201, may be performed so as to obtain the resolution of 1024×768. However, it is not necessarily necessary to perform the correction for obtaining the resolution of 1024×768.

Recorded image 1201 stored in storage section 3 can be projected and displayed by projector 100 and can also outputted to an external apparatus. For example, projector 100 can output recorded image 1201 as a video signal to another display device or can output recorded image 1201 as image data to a USB memory, and the like.

It should be noted that photographed image processing section 43 may perform background detection not on the basis of the synthetic input image and the writing image, but on the basis of an image of the inputted video signal, an image stored in frame memory section 12, and an image photographed by imaging section 4.

Further, photographed image processing section 43 may change the order of the correction of hue, the correction of brightness, and the correction of saturation based on the correlation between the hue, brightness and saturation.

Further, when the background of the input image or the writing image has no color (has no saturation or has low saturation), photographed image processing section 43 may perform only the correction of brightness. The case where the background of the writing image has no color corresponds to, for example, the case where the writing surface is a blackboard or a white board.

Further, photographed image processing section 43 is configured to perform hue, brightness and saturation corrections to the writing image, among the synthetic input image and the writing image but may also be configured to perform hue, brightness and saturation corrections to the synthetic input image instead of the writing image.

Further, photographed image processing section 43 is configured to perform hue, brightness and saturation corrections to an image subjected to resolution conversion and trapezoidal distortion correction, but may also be configured to perform hue, brightness and saturation corrections to respective images and then to perform resolution conversion and trapezoidal distortion correction to the images subjected to the hue, brightness and saturation corrections.

It should be noted that the control of video signal processing section 13 is performed by photographed image processing section 43, but photographed image processing section 43 may be configured to instruct control section 5 so that control section 5 controls video signal processing section 13.

Further, in the present exemplary embodiment, a video signal inputted from PC, or the like, is used as the input video signal, but a video signal based on image data stored in storage section 3 or a video signal based on image data inputted by using a USB terminal, or the like, may also be used as the input video signal.

Next, effects of the present exemplary embodiment will be described.

In the present exemplary embodiment, projection processing section 1 projects an input image corresponding to an input video signal onto projection surface 200 on which a user writes information.

Upon receiving a photographing instruction, processing section 4 stops projection by projection processing section 1 and then photographs projection surface 200 to generate a photographed image.

Processing section 4 detects the difference between the color of the background in the input image and the color of the projection surface in the photographed image, and generates a corrected image by correcting the color of the input image or the photographed image so as to reduce the difference between the colors, and further generates a recorded image by superimposing the corrected image on the other of the input image and the photographed image.

For this reason, even when the contrast between the color of the projection surface and the color of display information, such as a character, in the input image is low, in the recorded image, the difference between the color of the projection surface and the color of the background in the input image is reduced. Generally, in the input image, the contrast between the display information in the input image and the color of the background of the input image is set high. Therefore, in the recorded image, the contrast between the color of the display information and the color of the projection surface becomes high, so that the visibility of the display information in the recorded image can be prevented from being lowered.

In the present exemplary embodiment, while maintaining the relationship of each of the hue and brightness differences between the pixels in the input image, and also maintaining the relationship of each of the hue and brightness differences between the pixels in the photographed image, processing section 4 generates a corrected image by correcting the color of the background of the input image or the color of the projection surface in the photographed image so as to reduce the difference between the colors.

For this reason, in the recorded image, the relationship of each of the hue and brightness differences between the pixels in the input image, and the relationship of each of the hue and brightness differences between the pixels in the photographed image are maintained, so that the visibility of additional information in the photographed image can be prevented from being lowered on the recorded image.

In the present exemplary embodiment, processing section 4 detects the difference between the hue of the color of the background in the input image and the hue of the color of projection surface 200 in the photographed image, and shifts the hue of each of pixels in one of the input image and the photographed image so that the hue of the color of the background in the input image coincides with the hue of the color of projection surface 200 in the photographed image. Further, while maintaining the brightness difference relationship between the respective pixels in one of the images, processing section 4 generates a corrected image by correcting the brightness of each of the pixels in the one of the images so that the brightness of the color of the background of the input image and the brightness of the color of the projection surface in the photographed image are included in one divided brightness range of a plurality of divided brightness ranges obtained by dividing the brightness range that can be taken by the colors.

For this reason, in the recorded image, the difference between the hue of the color of the background in the input image and the hue of the color of the projection surface in the photographed image is reduced, and also the brightness of the color of the background in the input image and the brightness of the color of the projection surface in the photographed image are made to be included in a predetermined brightness range. It should be noted that the number of divided brightness ranges is not limited to 2, but may be a number larger than 2.

In the present exemplary embodiment, two divided brightness ranges (the black region and the white region) are used as the plurality of divided brightness ranges, and when the brightness of the color of the background and the brightness of the color of the projection surface respectively belong to the different divided brightness ranges, processing section 4 corrects the brightness of each of the pixels in one of the images by inverting white and black of the brightness of each of the pixels in the one of the images.

For this reason, in the recorded image, the brightness of the color of the background in the input image, and the brightness of the color of the projection surface in the photographed image can be made to be within the predetermined brightness range by the white-black inversion of the brightness.

In the present exemplary embodiment, in order that the saturation of the color of the background in the input image and the saturation of the color of the projection surface in the photographed image coincide with each other, processing section 4 corrects the saturation of each of the pixels in the input image or the photographed image.

For this reason, in recorded image 1201, it is possible to reduce the difference between the color of the background in the input image and the color of the projection surface in the photographed image.

It should be noted that, when the saturation value of the color of the background in the input image or the saturation value of the color of the projection surface in the photographed image is lower than a predetermined saturation value, processing section 4 does not correct the hue of the pixels in one of the images, and when the brightness of the color of the background in the input image and the brightness of the color of the projection surface in the photographed image are respectively included in different divided brightness ranges, processing section 4 corrects the brightness of the pixels of one of the images by performing black-white inversion of the brightness of each of the pixels in one of the images.

In this case, correction processing can be simplified.

(Second Embodiment)

Figure 13:
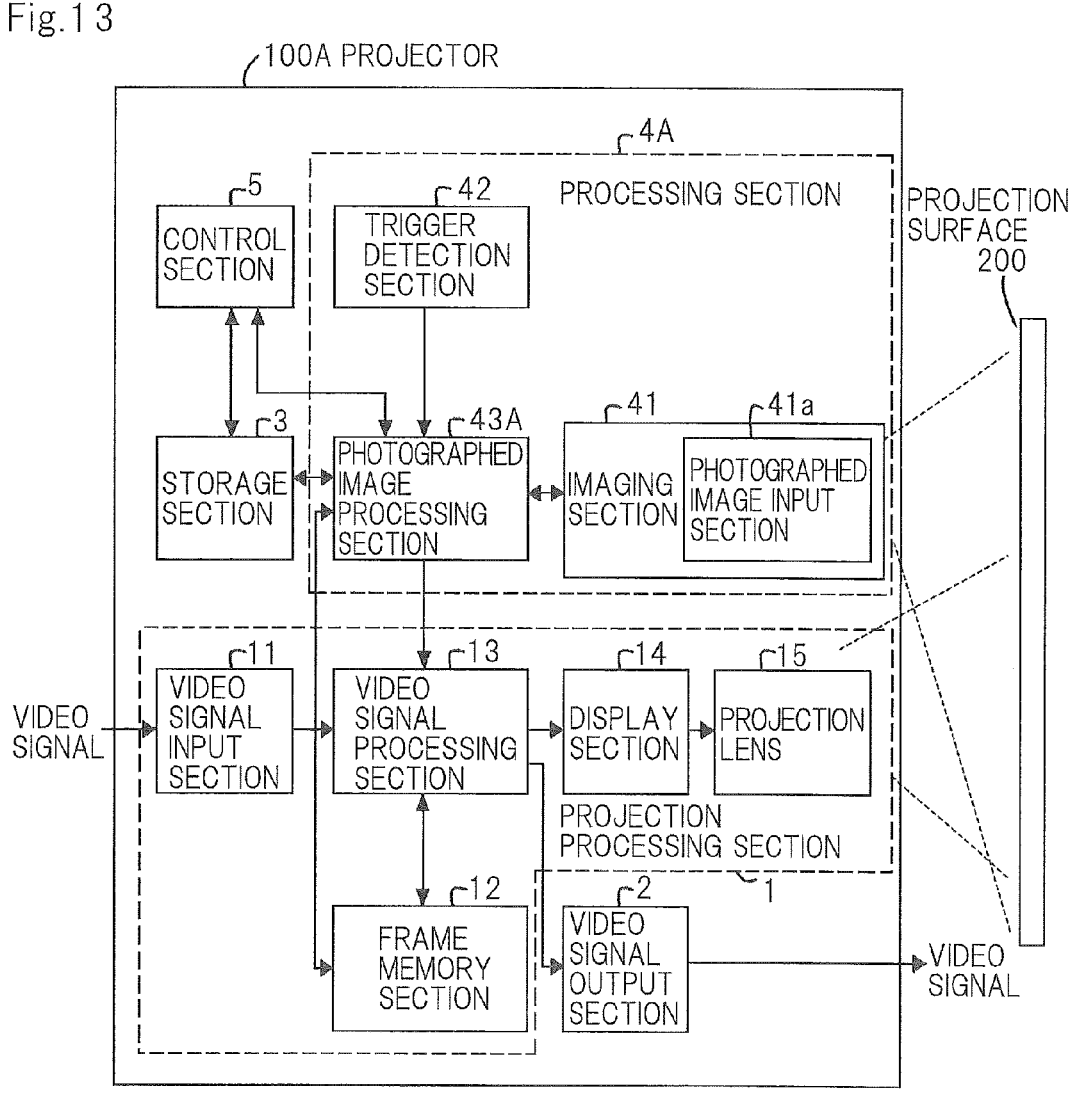
FIG. 13 is a view showing projector 100A of a second exemplary embodiment of the present invention.

FIG. 13 is a view showing projector 100A of a second exemplary embodiment of the present invention.

In FIG. 13, configurations that are the same as those shown in FIG. 1 are denoted by the same reference numerals and characters. In the following, projector 100A shown in FIG. 13 will be described by focusing on points that are different from projector 100 shown in FIG. 1.

In projector 100A shown in FIG. 13, processing section 4A is used instead of processing section 4 shown in FIG. 1, and photographed image processing section 43A is used instead of photographed image processing section 43.

Processing section 4A is an example of processing means.

Processing section 4A includes imaging section 41, trigger detection section 42, and photographed image processing section 43A.

When, among divided R ranges obtained by dividing the brightness range which can be taken by R pixels into two, the brightness of R pixels configuring the color of the projection surface in the photographed image does not belong to the divided R range to which the brightness of R pixels configuring the color of the background in the input image belongs, photographed image processing section 43A inverts white and black of the brightness of each of the R color pixels in the photographed image.

Further, when, among divided G ranges obtained by dividing the brightness range which can be taken by G pixels into two, the brightness of G pixels configuring the color of the projection surface in the photographed image does not belong to the divided G range to which the brightness of G pixels configuring the color of the background in the input image belongs, photographed image processing section 43A inverts white and black of the brightness of each of the G color pixels in the photographed image.

Further, when, among divided B ranges obtained by dividing the brightness range which can be taken by B pixels into two, the brightness of B pixels configuring the color of the projection surface in the photographed image does not belong to the divided B range to which the brightness of B pixels configuring the color of the background in the input image belongs, photographed image processing section 43A inverts white and black of the brightness of each of the B color pixels in the photographed image.

Next, operation will be described.

In the following, operation different from the operation of projector 100 shown in FIG. 1 will be mainly described.

In the present exemplary embodiment, the process until generating synthetic input image 1001 and writing image 901 is the same as the process in the first embodiment.

Photographed image processing section 43A generates a histogram for each of R, G, B of each of the pixels from gradation values of images of respective pixels included in a region (frame region) between the outer periphery of synthetic input image 1001 and the boundary configured by respective pixels existing on the inner side of the outer periphery by a predetermined number of pixels in synthetic input image 1001.

It should be noted that, photographed image processing section 43A may generate a histogram for each of R, G, B of each of the pixels from gradation values of images of respective pixels included in a region (frame region) between a first boundary configured by respective pixels that are on the inner side of the outer periphery of synthetic input image 1001 by a predetermined number of pixels, and a second boundary configured by respective pixels that are on the inner side of the first boundary by a predetermined number of pixels in synthetic input image 1001.

This is because the vicinity of the outer periphery of an image is used as the background in many cases. It should be noted that, when the position of the background can be specified beforehand in synthetic input image 1001, photographed image processing section 43A may generate a histogram for each of R, G, B of each of the pixels from gradation values of images of respective pixels located at the specified position.

For example, when the video signal level of each of R, G, B is specified by 256 gradation values from 0 to 255, photographed image processing section 43A generates a histogram by dividing the 256 gradation values into 32 blocks each formed by 8 gradation values, and by measuring, for each of the blocks, the number of appearance of each of the specified video signal levels in the frame region of one image frame.

Next, photographed image processing section 43A determines, for each of R, G, B, the block of gradation values that has a maximum number of the appearance based on the histogram generated from synthetic input image 1001, and sets the color represented by the block of gradation values determined for each of R, G, B, as the background color of synthetic input image 1001, that is, the background color of the inputted video signal (input image), so as to use, as the background, the pixels representing the background color. In this case, the gradation values in one block of the histogram are set to eight for each of R, G, B, and hence the number of background colors is obtained as 8×8×8=512. However, the background color is specified as the reference color of the background by using, for example, one of two gradation values located at the center of the block for each of R, G, B. In the following, processing is performed by using pixels representing 512 colors used as background colors, but the processing based on the background color is performed on the basis of the reference color of the background.

Further, photographed image processing section 43A may create, for each of R, G, B, a histogram in which one block of gradation values is set to one bar of the histogram, and in which 256 blocks are arranged along the horizontal axis, and may determine the background color by using the histogram. In this case, the background color is determined by one color that has a maximum number of appearances, but the circuit scale becomes large.

Next, photographed image processing section 43A detects the color of the background of writing region 200 in writing image 901, that is, the color of projection surface 200 in writing image 901.

First, photographed image processing section 43A generates, for each of R, G, B, a histogram of each of the pixels from the video signal level of each of pixels included in a region (frame area) between the outer periphery of writing region 200 and the boundary configured by respective pixels that are on the inner side from the outer periphery by a predetermined number of pixels, in writing region 200.

It should be noted that, photographed image processing section 43A may generate, for each of R, G, B, a histogram of each of the pixels from a video signal level of each of pixels included in the region (frame region) between a third boundary configured by respective pixels that are on the inner side of the outer periphery of writing region 200 by a predetermined number of pixels, and a fourth boundary configured by respective pixels that are on the inner side of the third boundary by a predetermined number of pixels, in writing region 200 in writing image 901.

Next, on the basis of the histogram of writing region 200, photographed image processing section 43A obtains the background color of writing region 200 (color of projection surface 200 in writing image 901) by a method similar to the method for determining the background color of synthetic input image 1001, and sets the pixels that representing the background color as the background.

Next, on the basis of the middle value (the gradation value of 127 and the gradation value of 128) of the R gradation values (256 gradation values from 0 to 255), photographed image processing section 43A specifies the region (dark region) having R gradation values of 0 to 127, and the region (bright region) having R gradation values of 128 to 255, and determines to which one of the regions each of the gradation value of R pixels configuring the background color of synthetic input image 1001, and the gradation value of R pixels configuring the background color of writing region 200 belongs.

As a result of the determination, when the gradation value of R pixels configuring the background color of synthetic input image 1001 and the gradation value of R pixels configuring the background color of writing region 200 belong to the same region, photographed image processing section 43A sets R inversion flag Fr to OFF. When the gradation value of R pixels configuring the background color of synthetic input image 1001 and the gradation value of R pixels configuring the background color of writing region 200 respectively belong to different regions, photographed image processing section 43A sets R inversion flag Fr to ON.

When R inversion flag Fr is ON, photographed image processing section 43A performs inversion processing in which the gradation value of R pixels configuring the background color of writing region 200 is inverted on the basis of the gradation value of 127.5 which is the middle value of the gradation values of R pixels. For example, when the gradation value of an R pixel is 0, photographed image processing section 43A sets the gradation value of the R pixel to 255.

Next, photographed image processing section 43A calculates R coefficient Kr which makes the gradation value of the R pixel configuring the background color of writing region 200 equal to the gradation value of the R pixel configuring the background color of synthetic input image 1001. When Fr is ON, photographed image processing section 43A calculates R coefficient Kr by an expression: Kr=(the gradation value of the R pixel configuring the background color of synthetic input image 1001)/(the inverted value of the gradation value of the R pixel configuring the background color of writing region 200). When Fr is OFF, photographed image processing section 43A calculates R coefficient Kr by an expression: Kr=(the gradation value of the R pixel configuring the background color of synthetic input image 1001)/(the gradation value of the R pixel configuring the background color of writing region 200).

Next, on the basis of the middle values (the gradation value of 127 and the gradation value of 128) of the G gradation values (256 gradation values from 0 to 255), photographed image processing section 43A specifies the region (dark region) having G gradation values of 0 to 127 and the region (bright region) having G gradation values of 128 to 255, and determines to which one of the regions each of the gradation value of G pixels configuring the background color of synthetic input image 1001, and the gradation value of G pixels configuring the background color of writing region 200 belongs As a result of the determination, when the gradation value of G pixels configuring the background color of synthetic input image 1001 and the gradation value of G pixels configuring the background color of writing region 200 belong to the same region, photographed image processing section 43A sets G inversion flag Fg to OFF. When the gradation value of G pixels configuring the background color of synthetic input image 1001 and the gradation value of G pixels configuring the background color of writing region 200 respectively belong to different regions, photographed image processing section 43A sets G inversion flag Fg to ON.

When G inversion flag Fg is ON, photographed image processing section 43A performs inversion processing in which the gradation value of G pixels configuring the background color of writing region 200 is inverted on the basis of the gradation value of 127.5 which is the middle value of the gradation values of G pixels. For example, when the gradation value of a G pixel is 0, photographed image processing section 43A sets the gradation value of the G pixel to 255.

Next, photographed image processing section 43A calculates G coefficient Kg which makes the gradation value of G pixels configuring the background color of writing region 200 equal to the gradation value of G pixels configuring the background color of synthetic input image 1001. When Fg is ON, photographed image processing section 43A calculates G coefficient Kg by an expression: Kg=(the gradation value of G pixels configuring the background color of synthetic input image 1001)/(the inverted value of the gradation value of G pixels configuring the background color of writing region 200). When Fg is OFF, photographed image processing section 43A calculates G coefficient Kg by an expression: Kg=(the gradation value of G pixels configuring the background color of synthetic input image 1001)/(the gradation value of G pixels configuring the background color of writing region 200).

Next, on the basis of the middle values (the gradation value of 127 and the gradation value of 128) of the B gradation values (256 gradation values from 0 to 255), photographed image processing section 43A specifies the region (dark region) having B gradation values of 0 to 127 and the region (bright region) having B gradation values of 128 to 255, and determines to which one of the regions each of the gradation value of B pixels configuring the background color of synthetic input image 1001 and the gradation value of B pixels configuring the background color of writing region 200 belongs.

As a result of the determination, when the gradation value of B pixels configuring the background color of synthetic input image 1001 and the gradation value of B pixels configuring the background color of writing region 200 belong to the same region, photographed image processing section 43A sets B inversion flag Fb to OFF. When the gradation value of B pixels configuring the background color of synthetic input image 1001 and the gradation value of B pixels configuring the background color of writing region 200 respectively belong to the different regions, photographed image processing section 43A sets B inversion flag Fb to ON.

When B inversion flag Fb is ON, photographed image processing section 43A performs inversion processing in which the gradation value of B pixels configuring the background color of writing region 200 is inverted on the basis of the gradation value of 127.5 that is the middle value of the B gradation value. For example, when the gradation value of a B pixel is 0, photographed image processing section 43A sets the gradation value of the B pixel to 255.

Next, photographed image processing section 43A calculates B coefficient Kb which makes the gradation value of B pixels configuring the background color of writing region 200 equal to the gradation value of B pixels configuring the background color of synthetic input image 1001. When Fb is ON, photographed image processing section 43A calculates B coefficient Kb by an expression: Kg=(the gradation value of B pixels configuring the background color of synthetic input image 1001)/(the inverted value of the gradation value of B pixels configuring the background color of writing region 200). When Fb is OFF, photographed image processing section 43A calculates B coefficient Kb by an expression: Kb=(the gradation value of B pixels configuring the background color of synthetic input image 1001)/(the gradation value of B pixels configuring the background color of writing region 200).

Next, photographed image processing section 43A corrects writing image 901 based on the determined relationship between the color of the background of synthetic input image 1001 and the color of the background of writing region 200.

First, photographed image processing section 43A performs R inversion flag processing on gradation values of all the R pixels configuring writing image 901 based on determined R inversion flag Fr. That is, when R inversion flag Fr is ON, photographed image processing section 43A performs inversion processing on the basis of the gradation value of 127.5 which is the middle value of the R gradation values. When R inversion flag Fr is OFF, photographed image processing section 43A does not perform inversion processing and leaves the R gradation values as they are. Next, on the basis of calculated R coefficient Kr, photographed image processing section 43A performs R coefficient processing in which the R coefficient Kr is multiplied to the gradation vales of all the R pixels of writing image 901 subjected to the R inversion flag processing.

Next, on the basis of determined G inversion flag Fg, photographed image processing section 43A performs G inversion flag processing on gradation values of all the G pixels configuring writing image 901. That is, when G inversion flag Fg is ON, photographed image processing section 43A performs inversion processing based on the gradation value of 127.5 that is the middle value of the G gradation values. When G inversion flag Fr is OFF, photographed image processing section 43A does not perform inversion processing and leaves the G gradation values as they are. Next, on the basis of calculated G coefficient Kg, photographed image processing section 43A performs G coefficient processing in which G coefficient Kg is multiplied to gradation values of all the G pixels of writing image 901 subjected to G inversion flag processing.

Next, on the basis of determined B inversion flag Fb, photographed image processing section 43A performs B inversion flag processing on gradation values of all the B pixels configuring writing image 901. That is, when B inversion flag Fb is ON, photographed image processing section 43A performs inversion processing based on the gradation value of 127.5 which is the middle value of the B gradation values. When B inversion flag Fb is OFF, photographed image processing section 43A does not perform inversion processing and leaves the B gradation values as they are. Next, on the basis of calculated B coefficient Kb, photographed image processing section 43A performs B coefficient processing in which the B coefficient Kb is multiplied to gradation vales of all the B pixels of writing image 901 subjected to the B inversion flag processing.

In the above, correction of writing image 901 is completed.

For this reason, in the present exemplary embodiment, there is a case where only one color of R, G, B is corrected.

Next, photographed image processing section 43A generates a recorded image by superimposing synthetic input image 1001 on corrected writing image 901 similarly to the processing performed by photographed image processing section 43 in the first embodiment.

With the present exemplary embodiment, even when an input image or a writing image has no background color (has no saturation or has low saturation), similar processing can be performed, and the processing can be simplified.

It should be noted that, in the present exemplary embodiment, the difference between the color of the background of the writing image and the color of the background of the input image is reduced as long as R inversion flag processing, G inversion flag processing and B inversion flag processing are performed. Therefore, R coefficient processing, G factor processing and B coefficient processing may be omitted. In this case, the processing can be simplified.

It should be noted that, in the first and second exemplary embodiments, the whole writing image 901 is corrected, but for example, in writing image 901, only the pixels of the colors related to the color of the background of writing image 901 may be corrected.

Examples of colors related to the color of the background of the writing image include the color of the background of the writing image, the complementary color of the color of the background of the writing image, the color of the background of the synthetic input image, the complementary color of the color of the background of the synthetic input image, colors similar to these colors, and the like.

For example, in writing image 901, only the color of the background of the writing image and the complementary color of the background color may be corrected.

Further, for example, the color (for example, green) of the background of writing image 901 and the complementary color (magenta) of the background color may be respectively corrected to the color (for example, blue) of the background of the synthetic input image and the complementary color (yellow) of the background color. Also, among the colors of writing image 901, the color (blue) of the background of the synthetic input image and the complementary color (of yellow which is the complementary color of the background of the synthetic input image) may be respectively corrected to the color (green) of the original background of writing image 901 and the complementary color (magenta) of the original background color. Further, among the colors of writing image 901, the color (blue) of the background of the synthetic input image and the complementary color (of yellow which is the complementary color of the background of the synthetic input image) may be respectively corrected to the complementary color (magenta) of the original background color of writing image 901 and the complementary color (green) of the original background color.

It should be noted that, in the above, the color of the background of writing image 901 and the complementary color of the color of the background of writing image 901 are described as examples of the colors related to the colors of the background of the writing image, but the color related to the color of the background of the writing image may be set to a predetermined range of colors including the color of the background of writing image 901 and to a predetermined range of colors including the complementary color of the color of the background of writing image 901.

It should be noted that, as a method for setting the predetermined range of colors, which range is difficult to be visually specified, there are various methods such as, for example, a method in which the predetermined range is set as a hue range in a range of ±5 degrees on the basis of specific colors (the background color and its complementary color), a method in which the predetermined range is set as a saturation or brightness range (defined from the minimum value 0 to the maximum value 1) in a range of ±0.05 on the basis of specific colors (the background color and its complementary color), and a method in which, when the specific colors (the background color and its complementary color) are represented by R, G, B signals, the predetermined range is set as a gradation value range of ±5 on the basis of the gradation values that are represented by respective R, G, B signals and that correspond to the specific colors (the background color and its complementary color).

It should be noted that the brightness can be substituted by a luminance signal, and the saturation and hue can also be substituted by color difference signals.

Further, the video signal level of the background may be extracted on the basis of a histogram of a predetermined region or on the basis of a video signal level at a predetermined point.

Further, the region in which the histogram is detected, or the point at which the video signal level is detected may not be in the vicinity of the outermost periphery. For example, when the vicinity of the center of an image is likely to be a background, the vicinity of the center of the image may be set as the background.

Further, it may be configured such that the region in which the histogram is detected, or the point at which the video signal level is detected, can be suitably set. For example, when a projection surface (writing surface) is photographed, it may be configured such that an input image and a photographed image are successively projected by using projector 100, and such that a person operating projector 100 specifies a region or a point by using a mouse, a remote controller, or the like, and thereby suitably sets a region in which a histogram is detected, or a point at which a video signal level is detected.

Further, when a region of a background is specified, the average value of the video signal levels of the region may be set as the video signal level of the background.

Further, the region to be photographed may be the same as projection region 200a or a part of projection region 200a.

Further, the synthetic input image may also be an image which is processed and generated by projector 100 on the basis of the input video signal as an image based on an input video signal.

Further, the input video signal may also be, for example, a signal corresponding to an image stored in storage section 3 provided in projector 100, or a signal corresponding to an image stored in a storage device connected to projector 100.

In each of the exemplary embodiments as described above, each of the illustrated configurations is a mere example, and the present invention is not limited to the illustrated configurations.

REFERENCE SIGNS LIST 100, 100A Projector
1 Projection processing section
11 Video signal input section
12 Frame memory section
13 Video signal processing section
14 Display section
15 Projection lens
2 Video signal output section
3 Storage section
4, 4A Processing section
41 Imaging section
41a Photographed image input section
42 Trigger detection section
43 Photographed image processing section
5, 5A Control section
200 Projection surface

The invention claimed is:

1. A projection type display device comprising:
projection means that projects an input image, representing an object on a background and corresponding to an input video signal, onto a projection surface on which a user writes information, and
processing means that, upon receiving a photographing instruction to perform photographing, stops projection by the projection means and photographs the projection surface to generate a photographed image, and detects a difference between the color of the background in the input image and the color of the projection surface in the photographed image, to generate a corrected image by correcting the color of the input image or the photographed image so as to reduce the difference, and generates a recorded image by superimposing the corrected image on the other of the input image and the photographed image.

2. The projection type display device according to claim 1, wherein
the processing means generates the corrected image by correcting a color of the input image or the photographed image so as to reduce the difference while maintaining a relationship between the difference in the hue of each pixel and the difference in brightness of each pixel in the input image, and maintaining a relationship between the difference in hue of each pixel and the brightness of each pixel in the photographed image.

3. The projection type display device according to claim 1, wherein
the processing means detects a difference between the hue of the color of the background in the input image and the hue of the color of the projection surface in the photographed image, and shifts, by the difference, the hue of each of the pixels in one of the images so as to make the hue of the color of the background coincide with the hue of the color of the projection surface, and further, generates the corrected image by, while maintaining the relationship in the difference in brightness between the respective pixels in the one image, correcting the brightness of the pixels in the one image so as to make the brightness of the color of the background and the brightness of the color of the projection surface belong to one from among a plurality of divided brightness ranges obtained by dividing a brightness range which can be taken by the colors.

4. The projection type display device according to claim 3, wherein
the plurality of divided brightness ranges are two divided brightness ranges, and
when the brightness of the color of the background and the brightness of the color of the projection surface respectively belong to the different divided brightness ranges, the processing means performs a black-white inversion of the brightness of each of the pixels in one of the images, so as to correct the brightness of each of the pixels in the one of the images.

5. The projection type display device according to claim 3, wherein
the processing means further corrects the saturation of each of the pixels in said one of the images so as to make the saturation of the color of the background coincide with the saturation of the color of the projection surface.

6. The projection type display device according to claim 4, wherein
when the saturation of the color of the background or the saturation of the color of the projection surface in the photographed image is lower than a predetermined saturation, the processing means does not correct the hue of each of the pixels in said one image, and when the brightness of the color of the background and the brightness of the color of the projection surface respectively belong to the different divided brightness ranges, the processing means performs a black-white inversion of the brightness of each of the pixels in said one image, to thereby correct the brightness of each of the pixels in said one image.

7. The projection type display device according to claim 1, wherein
the processing means
generates the corrected image by performing a black-white inversion of the brightness of respective R pixels in the photographed image, when, among R division ranges obtained by dividing the brightness range which can be taken by the R pixels into two, the brightness of the R pixels configuring the color of the projection surface in the photographed image does not belong to the R division range to which the brightness of the R pixels configuring the color of the background in the input image belongs,
by performing a black-white inversion of the brightness of respective G pixels in the photographed image, when, among G division ranges obtained by dividing the brightness range which can be taken by the G pixels into two, the brightness of the G pixels configuring the color of the projection surface in the photographed image does not belong to the G division range to which the brightness of the G pixels configuring the color of the background in the input image belongs, and
by performing a black-white inversion of the brightness of respective B pixels in the photographed image, when, among B division ranges obtained by dividing the brightness range which can be taken by the B pixels into two, the brightness of the B pixels configuring the color of the projection surface in the photographed image does not belong to the B division range to which the brightness of the B pixels configuring the color of the background in the input image belongs.

8. The projection type display device according to claim 1, wherein
the one image comprises the photographed image, and the other image is the input image, and
the processing means generates the corrected image by correcting the color of the projection surface in the photographed image and the color which is associated beforehand with the color of the projection surface.

9. A method of generating a recorded image in a projection type display device, the method comprising:
projecting an input image, representing an object on a background and that corresponds to an input video signal, onto a projection surface on which a user writes information; and
upon receiving a photographing instruction to perform photographing, stopping the projection and photographing the projection surface to generate a photographed image, and detecting a difference between the color of the background in the input image and the color of the projection surface in the photographed image, to generate a corrected image by correcting the color of the input image or the photographed image so as to reduce the difference, and generating a recorded image by superimposing the corrected image on the remaining input image or photographed image.

* * * * *